United States Patent
De Gaudemaris et al.

(10) Patent No.: US 11,203,680 B2
(45) Date of Patent: Dec. 21, 2021

(54) RUBBER COMPOSITION COMPRISING A SPECIFIC HYDROCARBON RESIN

(71) Applicant: COMPAGNIE GENERALE DES ETABLISSEMENTS MICHELIN, Clermont-Ferrand (FR)

(72) Inventors: Benoit De Gaudemaris, Clermont-Ferrand (FR); Alain Hut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 183 days.

(21) Appl. No.: 16/472,707

(22) PCT Filed: Dec. 5, 2017

(86) PCT No.: PCT/FR2017/053396
§ 371 (c)(1),
(2) Date: Jun. 21, 2019

(87) PCT Pub. No.: WO2018/115621
PCT Pub. Date: Jun. 28, 2018

(65) Prior Publication Data
US 2019/0367707 A1 Dec. 5, 2019

(30) Foreign Application Priority Data
Dec. 22, 2016 (FR) ...................... 1663104

(51) Int. Cl.
*C08L 9/06* (2006.01)
*B60C 1/00* (2006.01)
*B60C 11/00* (2006.01)
*C08L 9/00* (2006.01)

(52) U.S. Cl.
CPC .............. *C08L 9/06* (2013.01); *B60C 1/0016* (2013.01); *B60C 11/0008* (2013.01); *C08L 9/00* (2013.01); *B60C 2011/0025* (2013.01); *C08L 2312/00* (2013.01)

(58) Field of Classification Search
CPC . C08L 9/06; C08L 9/00; B60C 1/0016; B60C 11/0008; C08K 3/36
USPC ....................................................... 524/508
See application file for complete search history.

(56) References Cited

U.S. PATENT DOCUMENTS

| | | | |
|---|---|---|---|
| 5,227,425 A | 7/1993 | Rauline | |
| 5,852,099 A | 12/1998 | Vanel | |
| 5,900,449 A | 5/1999 | Custodero et al. | |
| 6,420,488 B1 | 7/2002 | Penot | |
| 6,433,104 B1 | 8/2002 | Macedo et al. | |
| 6,536,492 B2 | 3/2003 | Vasseur | |
| 6,774,255 B1 | 8/2004 | Tardivat et al. | |
| 7,217,751 B2 | 5/2007 | Durel et al. | |
| 7,250,463 B2 | 7/2007 | Durel et al. | |
| 7,300,970 B2 | 11/2007 | Durel et al. | |
| 7,488,768 B2 | 2/2009 | Tardivat et al. | |
| 7,491,767 B2 | 2/2009 | Durel et al. | |
| 7,820,771 B2 | 10/2010 | Lapra et al. | |
| 8,461,269 B2 | 6/2013 | Varagniat et al. | |
| 8,492,475 B2 | 7/2013 | Araujo Da Silva et al. | |
| 8,637,606 B2 | 1/2014 | Pille-Wolfe et al. | |
| 8,883,929 B2 | 11/2014 | Gandon-Pain et al. | |
| 9,010,393 B2 | 4/2015 | Araujo Da Silva et al. | |
| 9,856,368 B2 | 1/2018 | Herzog et al. | |
| 10,160,847 B2 | 12/2018 | Lesage et al. | |
| 2001/0034389 A1 | 10/2001 | Vasseur | |
| 2004/0051210 A1 | 3/2004 | Tardivat et al. | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2005/0065265 A1* | 3/2005 | Zanzig ...................... C08L 9/00 524/445 |
| 2008/0132644 A1 | 6/2008 | Lapra et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-pain et al. | |
| 2009/0324940 A1 | 12/2009 | Bohm et al. | |
| 2010/0022714 A1 | 1/2010 | Varagniat et al. | |
| 2010/0317800 A1* | 12/2010 | Pille-Wolf ................ C08L 9/06 525/149 |
| 2011/0021702 A1 | 1/2011 | Gandon-Pain et al. | |

(Continued)

FOREIGN PATENT DOCUMENTS

| CN | 102549026 A | 7/2012 |
|---|---|---|
| CN | 105579507 A | 5/2016 |

(Continued)

OTHER PUBLICATIONS

International Search Report dated Feb. 26, 2018, in corresponding PCT/FR2017/053396 (6 pages).

*Primary Examiner* — Doris L Lee
(74) *Attorney, Agent, or Firm* — Venable LLP

(57) ABSTRACT

A rubber composition based on at least: from 50 to 100 phr of one or more diene elastomers, referred to as very low glass transition temperature (Tg) diene elastomers, having a Tg within a range of from −110° C. to −70° C., selected from butadiene homopolymers, copolymers of butadiene and of a vinylaromatic monomer, having a content of vinylaromatic units of between 0 and 5% by weight, and mixtures thereof a reinforcing filler a crosslinking system; and from 50 to 150 phr of at least one hydrocarbon resin predominantly composed of units derived from terpene and phenol monomers, the resin having a content of aromatic protons of greater than 15%.

28 Claims, No Drawings

(56) References Cited

U.S. PATENT DOCUMENTS

| | | |
|---|---|---|
| 2011/0152458 A1 | 6/2011 | Araujo Da Silva et al. |
| 2012/0208948 A1 | 8/2012 | Gandon-Pain et al. |
| 2013/0267640 A1 | 10/2013 | Lopez et al. |
| 2013/0274404 A1 | 10/2013 | Vasseur et al. |
| 2013/0296471 A1 | 11/2013 | Lesage et al. |
| 2016/0194485 A1 | 7/2016 | Herzog et al. |
| 2016/0222197 A1 | 8/2016 | Peters et al. |
| 2016/0319116 A1 | 11/2016 | Labrunie et al. |
| 2017/0204256 A1 | 7/2017 | Labrunie et al. |
| 2017/0204257 A1 | 7/2017 | Labrunie et al. |
| 2018/0001702 A1 | 1/2018 | Chatard et al. |
| 2018/0186979 A1 | 7/2018 | Labrunie |
| 2018/0340055 A1 | 11/2018 | DeGaudemaris et al. |
| 2020/0190292 A1 | 6/2020 | DeGaudemaris et al. |

FOREIGN PATENT DOCUMENTS

| | | |
|---|---|---|
| EP | 0501227 A1 | 9/1992 |
| EP | 0735088 A1 | 10/1996 |
| EP | 0810258 A1 | 12/1997 |
| EP | 2 799 480 A1 | 11/2014 |
| EP | 2 974 884 * | 1/2016 |
| EP | 2 974 884 A1 | 1/2016 |
| JP | 11-209708 A | 8/1999 |
| JP | 11-311701 A | 11/1999 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2010/144890 A2 | 12/2010 |
| WO | 2015/043902 A1 | 4/2015 |
| WO | 2015/124681 A1 | 8/2015 |
| WO | 2016/109476 A1 | 7/2016 |

* cited by examiner

RUBBER COMPOSITION COMPRISING A SPECIFIC HYDROCARBON RESIN

BACKGROUND

The invention relates to compositions, especially for tyres, and more particularly to compositions comprising a specific hydrocarbon resin in order to improve the properties of the compositions in combination with elastomers having a very low glass transition temperature (Tg).

It is known from document WO 2016/109476 that terpene-phenol resins may present an advantage for braking properties.

It is also known from the prior art that elastomers having a low Tg enable an improvement in terms of abrasion performance (WO 2015/043902).

At present, the Applicants have shown that a particular composition comprising a specific hydrocarbon resin makes it possible to obtain compositions having an improvement in the cohesion, grip, rolling resistance and processability performance.

SUMMARY

The invention therefore relates to a rubber composition based on at least:
- from 50 to 100 phr of one or more diene elastomers, referred to as very low glass transition temperature (Tg) diene elastomers, having a Tg within a range of from −110° C. to −70° C., selected from butadiene homopolymers, copolymers of butadiene and of a vinylaromatic monomer, having a content of vinylaromatic units of between 0 and 5% by weight, and mixtures thereof,
- a reinforcing filler,
- a crosslinking system,
- from 50 to 150 phr of at least one hydrocarbon resin predominantly composed of units derived from terpene and phenol monomers, the resin having a content of aromatic protons of greater than 15%.

The invention also relates to a tyre comprising a composition as defined above and as defined preferentially below; preferably in all or part of the tread thereof. Preferentially, the tyre according to the invention will be selected from the tyres intended to equip a two-wheeled vehicle, a passenger vehicle, or else a "heavy goods" vehicle (that is to say, underground train, bus, off-road vehicles, heavy road transport vehicles, such as lorries, tractors or trailers), or else aircraft, construction equipment, agricultural vehicles or handling vehicles.

DETAILED DESCRIPTION

I—Constituents of the Composition

The rubber compositions according to the invention are based on at least: from 50 to 100 phr of one or more diene elastomers referred to as very low glass transition temperature (Tg) diene elastomers, having a Tg within a range of from −110° C. to −70° C., selected from butadiene homopolymers, copolymers of butadiene and of a vinylaromatic monomer, having a content of vinylaromatic units of between 0 and 5% by weight, and mixtures thereof, a reinforcing filler, a crosslinking system and from 50 to 150 phr of at least one hydrocarbon resin predominantly composed of units derived from terpene and phenol monomers, the resin having a content of aromatic protons of greater than 15%.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention may be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight relative to the total weight of the polymers in the composition. In the same way, a "predominant" filler is the one representing the greatest weight among the fillers of the composition. By way of example, in a system comprising just one polymer, the latter is predominant for the purposes of the present invention and, in a system comprising two polymers, the predominant polymer represents more than half of the weight of the polymers. On the contrary, a "minor" compound is a compound which does not represent the greatest fraction by weight among the compounds of the same type.

For the purposes of the present invention, when reference is made to a "predominant" unit (or monomer) within the same compound (or polymer), this is intended to mean that this unit (or monomer) is predominant among the units (or monomers) forming the compound (or polymer), that is to say it is the one which represents the greatest fraction by weight among the units (or monomers) forming the compound (or polymer). Thus, for example, a resin predominantly composed of units derived from terpene and phenol monomers is a resin in which the terpene and phenol units represent the greatest amount by weight among all the units making up said resin. In other words, a "predominant" monomer or a set of "predominant" monomers is a monomer (or a set of monomers) which represents the greatest fraction by weight in the polymer. On the contrary, a "minor" monomer is a monomer which does not represent the greatest molar fraction in the polymer.

The compounds mentioned in the description can be of fossil or biobased origin. In the latter case, they may partially or completely result from biomass or be obtained from renewable starting materials resulting from biomass. Polymers, plasticizers, fillers, and the like, are referred to in particular.

I-1 Diene Elastomer

The composition according to the invention may contain just one diene elastomer or a mixture of several diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of moieties or units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low content, always less than 15%, of moieties of diene origin). In the category of "essentially unsaturated" diene elastomers, a "highly unsaturated" diene elastomer is understood in particular to mean a diene elastomer having a content of moieties of diene origin (conjugated dienes) which is greater than 50%.

Given these definitions, and as is well known to a person skilled in the art, the term "diene elastomer" is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

For the requirements of the invention, the composition comprises, at a content within a range of from 50 to 100 phr, one or more diene elastomers, referred to as very low Tg diene elastomers, i.e. having a Tg within a range of from −110° C. to −70° C., the latter being selected from butadiene homopolymers, copolymers of butadiene and of a vinylaromatic monomer, having a content of vinylaromatic units of between 0 and 5% by weight, and mixtures thereof. Thus, the copolymers of butadiene and of a vinylaromatic monomer may contain from 95% to less than 100% by weight of diene units and from more than 0 to 5% by weight of vinylaromatic units.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The elastomers may have any microstructure, which depends on the polymerization conditions used, in particular on the presence or absence of a modifying and/or randomizing agent and on the amounts of modifying and/or randomizing agent used. The elastomers can, for example, be block, random, sequential or microsequential elastomers and can be prepared in dispersion or in solution. In the case of a copolymer based on a diene and on an aromatic vinyl, especially containing butadiene and styrene, the two monomers are preferentially distributed randomly.

Said very low Tg diene elastomer may be coupled and/or star-branched or functionalized with a group introduced via a coupling and/or star-branching or functionalization agent known to a person skilled in the art. This group can be located at the end of the linear main elastomer chain. It will then be said that the diene elastomer is functionalized at the chain end. It is generally an elastomer obtained by reaction of a living elastomer with a functionalization agent, that is to say any at least monofunctional molecule, the function being any type of chemical group known by those skilled in the art to react with a living chain end.

This group can be located in the linear main elastomer chain. It will then be said that the diene elastomer is coupled or else functionalized in the middle of the chain, in contrast to the position "at the chain end", although the group is not located precisely at the middle of the elastomer chain. It is generally an elastomer obtained by reaction of two chains of the living elastomer with a coupling agent, that is to say any at least difunctional molecule, the function being any type of chemical group known by those skilled in the art to react with a living chain end.

This group can be central, to which n elastomer chains (n>2) are bonded, forming a star-branched structure. It will then be said that the diene elastomer is star-branched. It is generally an elastomer obtained by reaction of n chains of the living elastomer with a star-branching agent, that is to say any polyfunctional molecule, the function being any type of chemical group known by those skilled in the art to react with a living chain end.

A person skilled in the art will understand that a functionalization reaction with an agent comprising more than one functional group which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

Preferably, for the requirements of the invention, said very low Tg diene elastomer has a Tg within a range of from −100° C. to −80° C., preferably from −95° C. to −80° C.

Preferably also, said very low Tg diene elastomer has a Mooney viscosity within a range of from 50 to 80. In the present description, Mooney viscosity is intended to mean the ML(1+4)100° C. Mooney viscosity of a compound, especially of the modified diene elastomer of the invention, measured according to standard ASTM D1646.

According to one preferred embodiment, said very low Tg diene elastomer comprises a copolymer of butadiene and of a vinylaromatic monomer, preferably styrene, having a content of vinylaromatic units of between 0 and 5% by weight and preferably from 1% to 4% by weight, and also a content of vinyl units relative to the diene portion ranging from 8 to 15% by weight, preferably ranging from 10 to 15% by weight, relative to the total weight of the diene elastomer.

Preferably, at least 70% by weight of said copolymer of butadiene and of a vinylaromatic monomer is functionalized, preferentially with an alkoxysilane group, optionally partially or completely hydrolysed to give silanol, the alkoxysilane group optionally bearing another function capable of interacting with a reinforcing filler, the alkoxysilane group being bonded to the diene elastomer by means of the silicon atom. Preferentially, said copolymer of butadiene and of a vinylaromatic monomer is functionalized predominantly in the middle of the chain. The microstructure of these elastomers may be determined by the presence or absence of a polar agent and the amounts of polar agent employed during the anionic polymerization step. Preferentially, when the diene elastomer is based on a diene and styrene, a polar agent is used during the polymerization step in amounts such that it promotes the random distribution of the styrene along the polymer chains while retaining the content of 1,2-bonds at preferably between 8% and 15%, preferably from 10% to 15%.

The term "alkoxysilane group interacting favourably with the reinforcing filler" or "function capable of interacting with a reinforcing filler" is understood to mean any alkoxysilane group or other function, preferentially amine function, capable of forming, within a rubber composition reinforced by means of a filler, a physical or chemical bond with said filler. This interaction can be established, for example, via covalent, hydrogen, ionic and/or electrostatic bonds between said function and functions present on fillers.

The alkoxy radical of the alkoxysilane group can be of formula R'0-, where R' represents a substituted or unsubstituted $C_1$-$C_{10}$, indeed even $C_1$-$C_8$, alkyl group, preferably a $C_1$-$C_4$ alkyl group, more preferably methyl and ethyl.

Very preferentially according to this second variant, the other function capable of interacting with a reinforcing filler is a primary, secondary or tertiary amine. This variant of the invention is particularly advantageous due to the improvement in the hysteresis properties.

In the present description, primary or secondary amine is intended to mean a primary or secondary amine optionally protected by a protecting group known to those skilled in the art.

Mention may be made, as secondary or tertiary amine functional group, of amines substituted by $C_1$-$C_{10}$, preferably $C_1$-$C_4$, alkyl radicals, more preferably a methyl or ethyl radical, or else cyclic amines forming a heterocycle comprising a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Preferably, the function capable of interacting with a reinforcing filler is a tertiary amine function, preferably diethylamine or dimethylamine.

According to an alternative form of the invention, the function, preferentially primary, secondary or tertiary amine function, capable of interacting with a reinforcing filler is directly bonded to the silicon atom itself directly bonded to the diene elastomer.

According to another alternative form of the invention, the function, preferentially primary, secondary or tertiary amine function, capable of interacting with a reinforcing filler and the silicon atom bonded to the diene elastomer are connected together by a spacer group which can be an atom or a group of atoms. The spacer group may be a saturated or unsaturated, cyclic or non-cyclic, linear or branched, divalent C1-C18 aliphatic hydrocarbon radical or a divalent C6-C18 aromatic hydrocarbon radical and may contain one or more aromatic radicals and/or one or more heteroatoms. The hydrocarbon radical may optionally be substituted.

Preferably, said copolymer of butadiene and of a vinyl aromatic monomer comprises more than 0 and up to 30% by weight (more preferentially between 0 and 20%), relative to the total weight of copolymer of butadiene and of a vinylaromatic monomer, of a star-branched copolymer of butadiene and of a vinylaromatic monomer.

Preferably, said copolymer of butadiene and of a vinylaromatic monomer is present at a content within a range of from 50 to 100 phr, preferably from 75 to 100 phr, very preferentially from 90 to 100 phr.

According to one preferred embodiment, said very low Tg diene elastomer comprises a butadiene homopolymer, preferably at a content within a range of from 1 to 50 phr, preferably from 1 to 30 phr, very preferentially from 1 to 10 phr.

According to another preferred embodiment, said copolymer of butadiene and of a vinylaromatic monomer is present at a content of 100 phr.

Preferentially, the composition according to the invention comprises a total content of very low Tg diene elastomers of from 75 to 100 phr, preferably from 90 to 100 phr and more preferentially of 100 phr.

When the composition comprises some, the additional elastomers of the very low Tg diene elastomers may be any elastomers known to those skilled in the art.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or else a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can comprise one type of silica or a blend of several silicas. The silica used may be any reinforcing silica known to those skilled in the art, especially any precipitated or fumed silica with a BET surface area and a CTAB specific surface area that are both less than 450 $m^2$/g, preferably from 30 to 400 $m^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface area as described in Application WO 03/16837.

The silica preferably has a BET surface area of between 45 and 400 $m^2$/g, more preferentially of between 60 and 300 $m^2$/g.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides referred to as "symmetrical", corresponding to the following general formula (III):

Z-A-Sx-A-Z, in which: (III)

x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);
Z corresponds to one of the formulae below:

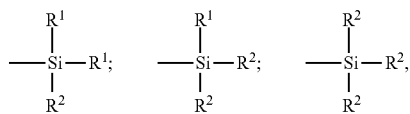

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl),
the $R^2$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxys and $C_5$-$C_8$ cycloalkoxys, more preferentially still a group chosen from $C_1$-$C_4$ alkoxys, in particular methoxy and ethoxy).

In the case of a mixture of alkoxysilane polysulfides corresponding to the above formula (III), especially normal commercially available mixtures, the mean value of the "x" values is a fractional number preferably of between 2 and 5, more preferentially of approximately 4. However, the invention may also advantageously be performed, for example, with alkoxysilane disulfides (x=2).

Mention will more particularly be made, as examples of silane polysulfides, of bis(($C_1$-$C_4$)alkoxy($C_1$-$C_4$)alkylsilyl ($C_1$-$C_4$)alkyl) polysulfides (especially disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. Mention will also be made, as preferential examples, of bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880).

Mention will also be made, as coupling agent other than alkoxysilane polysulfide, of bifunctional POSs (polyorganosiloxanes) or else hydroxysilane polysulfides ($R^2$=OH in the above formula III), such as described in Patent Applications WO 02/30939 (or U.S. Pat. No. 6,774,255) and WO 02/31041 (or US 2004/051210), or else silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferentially between 1 and 15 phr, more preferably between 3 and 14 phr.

Those skilled in the art will understand that, as filler equivalent to silica described in the present section, use might be made of a reinforcing filler of another nature, which is especially organic, provided that this reinforcing filler is covered with a layer of silica or else comprises functional sites, in particular hydroxyl sites, at its surface which require the use of a coupling agent in order to form the bond between the filler and the elastomer.

The physical state in which the reinforcing filler is provided is not important, whether it is in the form of a powder, of micropearls, of granules, of beads or any other appropriate densified form.

For the purposes of the invention, the content of total reinforcing filler (carbon black and/or reinforcing inorganic filler, such as silica) is from 5 to 200 phr, more preferentially from 40 to 160 phr. Below 5 phr of filler the composition might not be sufficiently reinforced, whereas above 200 phr of filler the composition might have poorer performance with regard to rolling resistance.

Use is preferably made of silica as predominant filler, preferably at a content ranging from 40 to 150 phr, more preferentially from 90 to 150 phr; and optionally carbon black. The carbon black, when it is present, is used in a minor amount, preferably at a content within a range extending from 0.1 to 10 phr, more preferentially from 0.5 to 10 phr, especially from 1 to 5 phr.

I-3 Crosslinking System

In the composition of the invention, any type of crosslinking system known to those skilled in the art for rubber compositions may be used.

The crosslinking system is preferably a vulcanization system, that is to say based on sulfur (or on a sulfur-donating agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

The sulfur is used at a preferential content of between 0.5 and 10 phr, more preferably of between 0.5 and 5 phr, in particular between 0.5 and 3 phr.

The vulcanization system of the composition according to the invention may also comprise one or more additional accelerators, for example compounds of the family of the thiurams, zinc dithiocarbamate derivatives, sulfenamides, guanidines or thiophosphates. Use may be made in particular of any compound capable of acting as accelerator of the vulcanization of diene elastomers in the presence of sulfur, especially accelerators of thiazole type and also derivatives thereof, accelerators of the thiuram type, and zinc dithiocarbamates. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N, N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds. Preferably, use is made of a primary accelerator of the sulfenamide type.

I-4 Specific Hydrocarbon Resin

The composition according to the invention comprises a specific hydrocarbon resin.

This hydrocarbon resin is predominately composed of units derived from terpene and phenol monomers, and has a content of aromatic protons of greater than 15%. This type of resin is described in document WO 2010/144890.

Preferably, the hydrocarbon resin of use for the purposes of the invention has a content of aromatic protons within a range of from 15% to 40%, preferably within a range of from 20% to 40%, preferably from 20% to 30%.

According to a preferential embodiment, the hydrocarbon resin of use for the purposes of the invention has a content of hydroxyl functions of between 0 and 160 mg of KOH/g (equivalent mg of KOH per g of resin), preferably within a range of from 1 to 50 mg/g, preferably from 5 to 30 mg of KOH/g.

Also preferably, the hydrocarbon resin of use for the purposes of the invention has a content of ethylenic protons of less than 1%, preferably of less than 0.5%. More preferentially, the resin does not comprise any ethylenic units.

The hydrocarbon resin of use for the purposes of the invention has an average molecular mass Mn of greater than 600 g/mol, preferably greater than 800 g/mol.

Preferably, the hydrocarbon resin of use for the purposes of the invention has a polydispersity index (PDI) of less than 1.7, preferably of less than 1.6.

Numerous hydrocarbon resins are available commercially. These resins may have characteristics, especially of chemical composition, of Mn, of content of aromatic or ethylenic protons or else of PDI, which differ depending on the suppliers.

The macrostructure (Mw, Mn, PDI and Mz) of the hydrocarbon resin is determined by size exclusion chromatography (SEC) on the basis of standards ISO 16014 (Determination of average molecular mass and molecular mass distribution of polymers using size exclusion chromatography), ASTM D5296 (Molecular Weight Averages and molecular weight distribution of polystyrene by High performance size exclusion chromatography), and DIN 55672 (size exclusion chromatography).

For these measurements, the resin sample is dissolved in non-antioxidized tetrahydrofuran up to a concentration of 1.5 g/l. The solution is filtered with a Teflon filter with a porosity of 0.45 μm, using for example a single-use syringe fitted with a filter. A volume of 100 μl is injected through a set of size exclusion chromatography columns. The mobile phase is eluted at a flow rate of 1 ml/min. The columns are thermostatically controlled at 35° C. in an oven. Detection is carried out by a refractometer thermostatically controlled at 35° C. The stationary phase of the columns is based on a polystyrene divinylbenzene gel with controlled porosity. The polymer chains are separated according to the space that they occupy when they are dissolved in the solvent: the larger the volume they occupy, the less the pores of the columns are accessible to them and the shorter their elution time.

A Moore calibration curve connecting the logarithm of the molar mass (log M) with the elution time (te) is produced beforehand with polystyrene standards and modelled using a third degree polynomial: Log (molar mass of polystyrene)=a+b te+c te2+d te3.

For the calibration curve, polystyrene standards with narrow molecular distributions are used (polydispersity index, PDI, of less than or equal to 1.1). The range of molar masses of these standards extends from 160 to approximately 70 000 g/mol. These standards may be grouped together in "families" of 4 or 5 standards having a log M increment of approximately 0.55 between each family.

Use may be made of certified (ISO 13885 and DIN 55672) standard kits such as, for example, the kits of vials from PSS (polymer standard service, reference PSS-pskitr11-3), and also an additional PS standard with Mp=162 g/mol (Interchim, reference 178952). These kits are in the form of 3 vials each containing a family of polystyrene standards in suitable amounts:

Black vial: Mp=1220, 4850, 15 500 and 67 500 g/mol.
Blue vial: Mp=376, 3470, 10 400, 46 000 g/mol.
Yellow vial: Mp=266, 1920, 7200, 28 000 g/mol.
PS162: Mp=162 g/mol.

The number-average molar mass (Mn), weight-average molar mass (Mw), the Mz and the polydispersity of the resin analysed are calculated from this calibration curve. This is why reference is made to molar masses relative to a polystyrene calibration.

For the calculation of the average masses and the PDI, the limits of integration of the product elution are defined on the chromatogram corresponding to the injection of the sample. The refractometric signal defined between the two limits of integration is "cut" every second. For each of these "elementary cuts", the elution time ti and the area of the signal from the detector Ai are read off.

It is recalled here that: PDI=Mw/Mn with Mw being the weight-average molecular mass and Mn being the number-average molecular mass. It is also recalled that the masses Mw, Mn and Mz are average masses calculated according to the following formulae:

$$MZ = \frac{\sum Ai * Mi^2}{\sum Ai * Mi}$$

$$Mn = \frac{\sum Ai}{\sum \frac{Ai}{Mi}}$$

$$Mw = \frac{\sum Ai * Mi}{\sum Ai}$$

in which Ai is the amplitude of the signal from the refractometric detector corresponding to the mass Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Columns Heater Module" and 4 columns mounted in series in the following order:

| Number | Brand | Range of molar masses (g/mol) | Length (mm) | Internal diameter (mm) | Particle size (μm) | Trade name | References (for information only) |
|---|---|---|---|---|---|---|---|
| Columns 1 and 2 | Polymer Laboratories | 200-400 000 | 300 | 7.5 | 5 | MIXED-D | PL1110-6504 |
| Columns 3 and 4 | Polymer Laboratories | 200-30 000 | 300 | 7.5 | 3 | MIXED-E | PL1110-6300 |

The content of aromatic protons (% HA) and the content of ethylenic protons (% HE) are measured by $^1$H NMR. This is determined relative to all the signals detected. Thus, the results obtained are expressed as % of area of peak.

The samples are dissolved in deuterated chloroform (CDCl$_3$) at an amount of approximately 10 mg of resin in approximately 1 ml of solvent. The spectra are acquired on a Bruker Avance 500 MHz spectrometer fitted with a Bruker "broad band" BBO z-grad 5 mm probe. The $^1$H NMR experiment uses a 30° single pulse sequence and a repetition time of 5 seconds between each acquisition. 64 accumulations are carried out at ambient temperature. The chemical shifts are calibrated with respect to the protonated impurity of the deuterated chloroform; δppm $^1$H at 7.20 ppm. The $^1$H NMR signals of the aromatic protons are located between 8.5 ppm and 6.2 ppm. The ethylenic protons for their part give rise to signals between 6.2 ppm and 4.5 ppm. Finally, the signals corresponding to aliphatic protons are located between 4.5 ppm and 0 ppm. The areas of each category of protons are related to the sum of these areas to thereby give a distribution in terms of of area for each category of protons.

The content of hydroxyl functions, expressed as mg of KOH/g, is measured according to the standard ASTM E222.

The commercially available resins below were analysed using the methods described above in order to determine their characteristics; Table 1 summarizes the results obtained.

and in a minor amount, aliphatic or aromatic units or else units of aliphatic/aromatic type, that is to say based on aliphatic and/or aromatic monomers, other than terpene and phenol monomers. This type of resin is described in document WO 2010/144890.

Suitable as terpene monomers are, for example: alpha-pinene, beta-pinene, carenes, limonene or dipentene. Suitable as phenolic monomers are in particular: phenol or alkylated phenols.

Suitable as aromatic monomers are, for example: styrene, α-methylstyrene, ortho-, meta- or para-methylstyrene, vinyltoluene, para-(tert-butyl)styrene, divinylbenzene, vinylnaphthalene, indene, or any vinylaromatic monomer resulting from a C$_9$ fraction (or more generally from a C$_8$ to C$_{10}$ fraction). Preferably, the vinylaromatic monomer is styrene or α-methylstyrene or a vinylaromatic monomer resulting from a C$_9$ fraction (or more generally from a C$_8$ to C$_{10}$ fraction).

The content of resin in the composition according to the invention is within a range extending from 50 phr to 150 phr, preferentially from 55 to 120 phr, more preferentially from 60 to 115 phr, even more preferentially from 60 to 110 phr, better still from 65 to 110 phr. Indeed, below 50 phr of the resin of use for the purposes of the invention, the effect of the resin would be insufficient and the composition could have problems of grip, whereas above 150 phr, the composition could present manufacturing difficulties in terms of readily incorporating all the resin into the composition.

TABLE 1

| Resin | Supplier | Trade name | Tg (° C.) | Monomers | Content of arom. H (%) | Content of ethyl. H (%) | Content of aliph. H (%) | Mn (g/mol) | Mw (g/mol) | PDI | Content of OH (mg of KOH/g) |
|---|---|---|---|---|---|---|---|---|---|---|---|
| Resin 1 | Arizona | Sylvatraxx 6720 | 67 | Terpene Phenol | 27 | <1 | 72 | 881 | 1291 | 1.47 | 13 |
| Resin 2 | Arizona | Sylvares TP 2040 | 76 | Terpene Phenol | 13 | 3 | 84 | 607 | 770 | 1.27 | 140 |
| Resin 3 | Arizona | Sylvares TP 7042 | 100 | Terpene Phenol | 10 | 2 | 88 | 778 | 972 | 1.25 | 100 |
| Resin 4 | DRT | Dertophene 1510 | 105 | Terpene Phenol | 10 | 2 | 88 | 763 | 941 | 1.23 | — |
| Resin 5 | Arizona | Sylvares TP 2019 | 70 | Terpene Phenol | 8 | 1 | 91 | 669 | 917 | 1.37 | 80 |
| Resin 6 | DRT | Dercolyte L120 | 74 | D-Limonene | 1 | 2 | 98 | 670 | 1130 | 1.69 | 0 |

By analysis of the commercial resins, Table 1 shows that only the resin 1 meets the criteria of the resin of use for the purposes of the invention.

The resin of use for the purposes of the invention, predominantly composed of units derived from terpene and phenol monomers, may comprise, in addition to these units I-5 Other Possible Additives The rubber compositions in accordance with the invention optionally also comprise all or some of the standard additives customarily used in elastomer compositions intended especially for the manufacture of treads, such as, for example, pigments, protective agents, such as antiozone waxes, chemical antiozonants or to antioxidants, plasticizing agents other than those described above, anti-fatigue agents, reinforcing resins, methylene acceptors (for example phenol-novolac resin) or methylene donors (for example HMT or H3M).

The composition according to the invention may also comprise a plasticizing system. This plasticizing system may be composed of a hydrocarbon resin with a Tg above 20° C., in addition to the specific hydrocarbon resin described above, and/or a plasticizing oil.

Of course, the compositions in accordance with the invention can be used alone or as a blend (i.e., as a mixture) with any other rubber composition which can be used for the manufacture of tyres.

It is obvious that the invention relates to the rubber compositions described above both in the "raw" or non-crosslinked state (i.e., before curing) and in the "cured" or crosslinked, or else vulcanized, state (i.e., after crosslinking or vulcanization).

II-Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 200° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical steps. During a first step, the elastomers, the reinforcing fillers and the hydrocarbon resin (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, preferentially from 0.5 to 2 min, and a rise in the temperature to 90° C. to 100° C., the other ingredients (that is to say, those which remain, if not all were put in at the start) are added all at once or in portions, with the exception of the crosslinking system, during a compounding ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling of the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, in particular for laboratory characterization, or else extruded, in order to form, for example, a rubber profiled element used in the manufacture of semi-finished products for tyres. These products may then be used for the manufacture of tyres, according to techniques known to those skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

III-Exemplary Embodiments of the Invention

III-1 Preparation of the Examples

In the examples which follow, the rubbery compositions were produced as described above.

III-2 Characterization of the Examples

In the examples, the rubber compositions are characterized, before and/or after curing, as indicated below.
Tensile Tests (after Curing)

These tensile tests make it possible to determine the moduli of elasticity and the properties at break and are based on standard NF ISO 37 of December 2005. The nominal secant modulus (or apparent stress, in MPa, relative to the strain, which is unitless) is measured at 23° C. in second elongation (i.e., after an accommodation cycle at the extension rate provided for the measurement itself) at 100% elongation (denoted MA100) and/or at 300% elongation (denoted MA300). The true stresses at break (in MPa) and the elongations at break (in %) may also be also measured.

The stress at break value is a good indicator of the cohesion of the compound: the higher the value, the better the cohesion. For greater readability, the results will be shown according to the performance, in base 100, the value 100 being assigned to the control. A result of less than 100 will indicate a decrease in the cohesion performance of the compound, and, conversely, a result of greater than 100 will indicate an increase in the performance.
Measurement of the Mooney Viscosity (or Mooney Plasticity)

Use is made of an oscillating consistometer as described in French standard NF T 43-005 (1991). The Mooney plasticity measurement is taken according to the following principle: the composition in the raw state (i.e. before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney units" (MU, with 1 MU=0.83 newton.metre). To facilitate reading and understanding, the results are expressed in terms of performance in base 100; that is to say that the value 100 is arbitrarily assigned to the best control, in order to subsequently compare the values of the various solutions tested. In this way, a lower value represents a decrease in performance whereas a higher value represents a better performance.
Dynamic Properties (after Curing)

The dynamic properties $G^*$ and $\tan(\delta)$max are measured on a viscosity analyser (Metravib V A4000) according to Standard ASTM D 5992-96. The response is recorded of a sample of vulcanized composition (cylindrical test specimen with a thickness of 4 mm and a diameter of 10 mm), subjected to a simple alternating sinusoidal shear stress, at a frequency of 10 Hz. A temperature sweep is carried out from −80° C. to +100° C. with a ramp of +1.5° C./min, under a maximum stress of 0.7 MPa. The value of the tangent of the loss angle (tan(δ)) is then noted at 0° C. and 60° C.

For the value of tan(δ) at 60° C., the lower the value, the lower will be the hysteresis of the composition and thus the lower will be the rolling resistance. The results are expressed in terms of performance in base 100, that is to say that the value 100 is arbitrarily assigned to the best control, in order to subsequently compare the tan(δ) at 60° C. (that is to say the hysteresis—and hence the rolling resistance) of the various solutions tested. The value in base 100 is calculated according to the operation: (value of tan(δ) at 60° C. of the control/value of tan(δ) at 60° C. of the sample)*100. In this way, a lower value represents a reduction in the hysteresis performance (that is to say an increase in the hysteresis), while a higher value represents a better hysteresis performance (that is to say a lower hysteresis).

For the value of tan(δ) at 0° C., the higher the value, the more the composition will enable good wet grip. The results are expressed in terms of performance in base 100, that is to say that the value 100 is arbitrarily assigned to the best control, in order to calculate and subsequently compare the tan(δ) at 0° C. of the various solutions tested. The value in base 100 is calculated according to the operation: (value of tan(δ) at 0° C. of the sample/value of tan(δ) at 60° C. of the control)*100. In this way, a lower value represents a reduction in the grip performance (that is to say a lower tan(δ) value at 0° C.), while a higher value represents a better grip performance (that is to say a higher tan(δ) value at 0° C.).

III-3 Examples

The compositions are manufactured with introduction of all of the constituents on an internal mixer, with the exception of the vulcanization system. The vulcanizing agents (sulfur and accelerator) are introduced on an external mixer at low temperature (the constituent rolls of the mixer being at around 30° C.).

SBR A—Preparation of an SBR Aminoalkoxysilane-Functional in the Middle of the Chain with Tg −88° C.

Methylcyclohexane, butadiene, styrene and tetrahydrofurfuryl ethyl ether are continuously introduced in the following proportions: butadiene flow rate by weight=4.013 kg.h−1, styrene flow rate by weight=0.122 kg.h−1, concentration by weight of monomer=9.75 wt. %, 15 ppm of tetrahydrofurfuryl ethyl ether, into a 32 l continuously-fed stirred-tank reactor, assumed to be ideally stirred according to those skilled in the art. n-Butyllithium (n-BuLi) is introduced in a sufficient amount in order to neutralize the protic impurities introduced by the different constituents present at the inlet of the first reactor; 850 μmol of n-BuLi per 100 g of monomer are introduced.

The various flow rates are calculated in order for the mean residence time in the reactor to be 35 min. The temperature is maintained at 95° C. A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The treated polymer is subsequently separated from its solution by a steam stripping operation and then dried on an open mill at 100° C. The "initial" intrinsic viscosity measured is 1.98 dl.g$^{-1}$. The number-average molar mass Mn, determined by the SEC technique, is 90 000 g·mol$^{-1}$ and the polydispersity index PDI is 1.90. At the outlet of the polymerization reactor, 440 μmol per 100 g of monomer of (3-N,N-dimethylaminopropyl)trimethoxysilane (coupling and star-branching agent CA) in solution in methylcyclohexane are added to the solution of living polymer (CA/Li=0.52).

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C.

The "final" intrinsic viscosity measured is 2.52 dl.g$^{-1}$. The jump in viscosity, defined as the ratio of said "final" viscosity to said "initial" viscosity, is in this instance 1.27. The Mooney viscosity of this polymer A is 70. The number-average molar mass Mn, determined by the SEC technique, is 168 600 g·mol$^{-1}$ and the polydispersity index PDI is 1.68. The microstructure of this polymer is determined by the NIR method. The content of 1,2-units is 12.7% relative to the butadiene units. The content by weight of styrene is 2.1%. The glass transition temperature of this polymer is −88° C. The cold-flow CF(1+6)100° C. of the polymer is 0.52. The distribution of the entities after functionalization is given with the modelling method described above: 86% of functional chains, 77% of which are functional in the middle of the chain, and 14% of non-functional star-branched chains.

Compositions

The object of the examples presented in Table 2 is to compare the various rubber properties of control compositions (T1 to T7) to the properties of compositions in accordance with the invention (C1 and C2). The properties measured, before and after curing, are presented in Table 3.

TABLE 2

| Composition | T1 | T2 | C1 | C2 | T3 | T4 | T5 | T6 | T7 |
|---|---|---|---|---|---|---|---|---|---|
| Elastomer 1 (1) | 100 | 0 | 0 | 0 | 0 | 0 | 0 | 0 | 0 |
| Elastomer 2 (2) | 0 | 100 | 100 | 0 | 100 | 100 | 100 | 100 | 100 |
| Elastomer 3 (3) | 0 | 0 | 0 | 100 | 0 | 0 | 0 | 0 | 0 |
| Carbon black (4) | 4 | 4 | 4 | 4 | 4 | 4 | 4 | 4 | 4 |
| Silica (5) | 130 | 130 | 130 | 130 | 130 | 130 | 130 | 130 | 130 |
| Coupling agent (6) | 13 | 13 | 13 | 13 | 13 | 13 | 13 | 13 | 13 |
| Resin 1 (7) | 88 | 40 | 88 | 88 | 0 | 0 | 0 | 0 | 0 |
| Resin 2 (7) | 0 | 0 | 0 | 0 | 88 | 0 | 0 | 0 | 0 |
| Resin 3 (7) | 0 | 0 | 0 | 0 | 0 | 88 | 0 | 0 | 0 |
| Resin 4 (7) | 0 | 0 | 0 | 0 | 0 | 0 | 88 | 0 | 0 |
| Resin 5 (7) | 0 | 0 | 0 | 0 | 0 | 0 | 0 | 88 | 0 |
| Resin 6 (7) | 0 | 0 | 0 | 0 | 0 | 0 | 0 | 0 | 88 |
| Antioxidant (8) | 6 | 6 | 6 | 6 | 6 | 6 | 6 | 6 | 6 |
| Stearic acid (9) | 3 | 3 | 3 | 3 | 3 | 3 | 3 | 3 | 3 |

TABLE 2-continued

| Composition | T1 | T2 | C1 | C2 | T3 | T4 | T5 | T6 | T7 |
|---|---|---|---|---|---|---|---|---|---|
| DPG (10) | 2.5 | 2.5 | 2.5 | 2.5 | 2.5 | 2.5 | 2.5 | 2.5 | 2.5 |
| ZnO (11) | 1 | 1 | 1 | 1 | 1 | 1 | 1 | 1 | 1 |
| Accelerator (12) | 2.3 | 2.3 | 2.3 | 2.3 | 2.3 | 2.3 | 2.3 | 2.3 | 2.3 |
| Sulfur | 0.7 | 0.7 | 0.7 | 0.7 | 0.7 | 0.7 | 0.7 | 0.7 | 0.7 |

(1) Elastomer 1: SBR solution with 27% of styrene units and 24% of 1,2-units of the butadiene part (Tg = −48° C.);
(2) Elastomer 2: SBR A as prepared above, with 2.1% of styrene units and 12.7% of 1,2-units of the butadiene part (Tg = −88° C.);
(3) Elastomer 3: BR, N103 sold by Asahi with 13% of 1,2-units of the butadiene part (Tg = −92° C.);
(4) Carbon black, ASTM N234 grade
(5) Silica, Zeosil 1165 MP from Solvay, HDS type
(6) Coupling agent: Si69 from Evonik-Degussa
(7) Resins 1 to 6: cf Table 1 above
(8) N-(1,3-Dimethylbutyl)-N-phenyl-p-phenylenediamine (Santoflex 6-PPD) from Flexsys
(9) Stearin, Pristerene 4931 from Uniqema
(10) Diphenylguanidine, Perkacit DPG from Flexsys
(11) Zinc oxide, industrial grade-Umicore
(12) N-Cyclohexyl-2-benzothiazolesulfenamide (Santocure CBS from Flexsys)

TABLE 3

| Composition | T1 | T2 | C1 | C2 | T3 | T4 | T5 | T6 | T7 |
|---|---|---|---|---|---|---|---|---|---|
| tan (σ) at 0° C. performance (base 100) | 100 | 62 | 97 | 103 | 22 | 51 | 36 | 95 | 98 |
| tan (σ) at 60° C. performance (base 100) | 100 | 98 | 94 | 96 | 34 | 50 | 45 | 85 | 100 |
| Breaking stress performance (base 100) | 100 | 109 | 114 | 90 | 98 | 120 | 115 | 105 | 84 |
| Mooney performance (base 100) | 100 | 49 | 102 | 147 | 95 | 100 | 93 | 98 | 101 |
| Average of the performance results | 100 | 80 | 102 | 109 | 62 | 80 | 72 | 96 | 96 |

Compared to the control compositions, it is noted that the compositions C1 and C2, in accordance with the invention, enable an improved compromise of the cohesion, grip, rolling resistance and processability performance of the compositions, as indicated by the average of the performance results in Table 3.

The invention claimed is:

1. A rubber composition comprising at least:
   from 50 to 100 phr of at least one diene elastomer,
      wherein the at least one diene elastomer is a very low glass transition temperature Tg diene elastomer, having a Tg within a range of from −110° C. to −70° C. and selected from the group consisting of butadiene homopolymers, copolymers of butadiene and of a vinylaromatic monomer, having a content of vinylaromatic units of between 0 and 5% by weight, and mixtures thereof;
   a reinforcing filler;
   a crosslinking system; and
   from 50 to 150 phr of at least one hydrocarbon resin predominantly composed of units derived from terpene and phenol monomers, the resin having a content of aromatic protons of greater than 15%.

2. The rubber composition according to claim 1, wherein the very low glass transition temperature Tg diene elastomer is present at a total content of from 75 to 100 phr.

3. The rubber composition according to claim 1, wherein the very low glass transition temperature Tg diene elastomer has a Tg within a range of from −100° C. to −80° C.

4. The rubber composition according to claim 1, wherein the very low glass transition temperature Tg diene elastomer has a Mooney viscosity within a range of from 50 to 80.

5. The rubber composition according to claim 1, wherein the very low glass transition temperature Tg diene elastomer comprises a copolymer of butadiene and of a vinylaromatic monomer, having a content of vinylaromatic units of between 0 and 5% by weight and also a content of vinyl units relative to a diene portion ranging from 8% to 15% by weight relative to a total weight of the diene elastomer.

6. The rubber composition according to claim 5, wherein at least 70% by weight of the copolymer of butadiene and of a vinylaromatic monomer is functionalized.

7. The rubber composition according to claim 6, wherein the copolymer of butadiene and of a vinylaromatic monomer is functionalized with an alkoxysilane group, optionally partially or completely hydrolyzed to give silanol, the alkoxysilane group optionally bearing another function capable of interacting with a reinforcing filler, the alkoxysilane group being bonded to the diene elastomer by means of the silicon atom.

8. The rubber composition according to claim 6, wherein the copolymer of butadiene and of a vinylaromatic monomer is functionalized predominantly in the middle of the chain.

9. The rubber composition according to claim 5, wherein the copolymer of butadiene and of a vinylaromatic monomer comprises more than 0 and up to 30% by weight, relative to the total weight of the copolymer of butadiene and of a vinylaromatic monomer, of a star-branched copolymer of butadiene and of a vinylaromatic monomer.

10. The rubber composition according to claim 9, wherein the copolymer of butadiene and of a vinylaromatic monomer comprises between 0 and 20% by weight of a star-branched copolymer of butadiene and of a vinylaromatic monomer.

11. The rubber composition according to claim 1, wherein the copolymer of butadiene and of a vinylaromatic monomer is present at a content within a range of from 50 to 100 phr.

12. The rubber composition according to claim 11, wherein the copolymer of butadiene and of a vinylaromatic monomer is present at a content within a range of from 90 to 100 phr.

13. The rubber composition according to claim 1, wherein the very low glass transition temperature Tg diene elastomer comprises a butadiene homopolymer.

14. The rubber composition according to claim 13, wherein the butadiene homopolymer is present at a content within a range of from 1 to 50 phr.

15. The rubber composition according to claim 1, wherein a content of the hydrocarbon resin is within a range of from 55 to 120 phr.

16. The rubber composition according to claim 1, wherein the hydrocarbon resin has a content of aromatic protons within a range of from 15% to 40%.

17. The rubber composition according to claim 1, wherein the hydrocarbon resin has a content of aromatic protons within a range of from 20% to 40%.

18. The rubber composition according to claim 1, wherein the hydrocarbon resin has a content of hydroxyl functions of between 0 and 160 mg of KOH/g.

19. The rubber composition according to claim 1, wherein the hydrocarbon resin has a content of ethylenic protons of less than 1%.

20. The rubber composition according to claim 1, wherein the hydrocarbon resin does not comprise any ethylenic units.

21. The rubber composition according to claim 1, wherein the hydrocarbon resin has an Mn of greater than 600 g/mol.

22. The rubber composition according to claim 1, wherein the hydrocarbon resin has a polydispersity index of less than 1.7.

23. The rubber composition according to claim 1, wherein the reinforcing filler is selected from the group consisting of silicas, carbon blacks, and mixtures thereof.

24. The rubber composition according to claim 1, wherein a content of reinforcing filler is within a range of from 5 to 200 phr.

25. The rubber composition according to claim 1, wherein a predominant reinforcing filler is silica at a content within a range of from 40 to 150 phr.

26. The rubber composition according to claim 25 further comprising a minority amount of carbon black at a content within a range of from 0.1 to 10 phr.

27. A tire comprising the rubber composition according to claim 1.

28. The tire according to claim 27, wherein the rubber composition constitutes all or part of a tread of the tire.

* * * * *